(12) United States Patent
Maul et al.

(10) Patent No.: US 8,324,792 B2
(45) Date of Patent: Dec. 4, 2012

(54) PRE-CHAMBER SPARK PLUG

(75) Inventors: Georg Maul, Wurzach (DE); Jens Paesold, Weinsberg (DE); Uwe Sailer, Sinsheim (DE); Dieter Kuhnert, Sinsheim (DE)

(73) Assignee: MULTITORCH GmbH, Sinsheim (DE)

( * ) Notice: Subject to any disclaimer, the term of this patent is extended or adjusted under 35 U.S.C. 154(b) by 0 days.

(21) Appl. No.: 13/038,765

(22) Filed: Mar. 2, 2011

(65) Prior Publication Data

US 2011/0215703 A1 Sep. 8, 2011

(51) Int. Cl.
*H01T 13/20* (2006.01)
*H01T 21/02* (2006.01)

(52) U.S. Cl. .............................. 313/141; 445/7
(58) Field of Classification Search .................. 313/141, 313/138, 118; 445/7
See application file for complete search history.

(56) References Cited

U.S. PATENT DOCUMENTS

| | | |
|---|---|---|
| 5,554,908 A | 9/1996 | Kuhnert et al. |
| 5,557,158 A | 9/1996 | Kanao et al. |
| 6,414,420 B1 * | 7/2002 | Suzuki .......................... 313/144 |
| 6,827,620 B1 | 12/2004 | Mizutani |
| 2004/0239224 A1 * | 12/2004 | Orjela et al. .................. 313/142 |
| 2007/0130751 A1 * | 6/2007 | Lykowski .................... 29/592.1 |

FOREIGN PATENT DOCUMENTS

DE 40 11 630 A1 10/1991

* cited by examiner

*Primary Examiner* — Karabi Guharay

(57) ABSTRACT

The invention relates to a pre-chamber spark plug with a housing which, at its forward end, comprises a pre-chamber with a plurality of openings, an insulator arranged in the housing, a center electrode which is surrounded by the insulator and supports an ignition electrode arranged in the pre-chamber which comprises a plurality of electrode arms, wherein the electrode arms each comprise a rear section which extends in a transverse direction in relation to the longitudinal direction of the center electrode and a forward section which extends along a pre-chamber wall and forms a spark gap between itself and the pre-chamber wall. It is provided according to the invention that the electrode arms are embedded in the center electrode and project from a lateral surface of the center electrode. Furthermore, the invention relates to a method according to the invention.

16 Claims, 2 Drawing Sheets

PRE-CHAMBER SPARK PLUG

The present invention relates to a pre-chamber spark plug such described in EP 0 675 272 A1.

Such a pre-chamber spark plug has a housing which, at its forward end, comprises a pre-chamber with a plurality of openings. In the pre-chamber, a fuel-air mixture can be ignited by means of an arc discharge, with the result that a burning gaseous mixture exits from the openings of the pre-chamber in the form of what is called torch jets and ignites a fuel-air mixture in the combustion chamber of an engine.

An insulator supporting a center electrode is arranged in the housing of a pre-chamber spark plug. In pre-chamber spark plugs, the center electrode is sometimes also referred to as electrode support because it supports an ignition electrode arranged in the pre-chamber. The ignition electrode has a plurality of, usually four, electrode arms which, starting from the center electrode, extend in a radially outward direction and extend along a pre-chamber wall with a subsequent section. This forward section of the electrode arms forms a spark gap for an arc discharge between itself and the wall of the pre-chamber.

Pre-chamber spark plugs are to advantage in that, as compared with other spark plug types, they have a long service life and an excellent ignition behavior. Among other things, these advantages are based on the fact that the ignition electrode comprises a plurality of electrode arms which can each generate an electric arc.

The present invention aims at showing a way how the service life of pre-chamber spark plugs can be improved even further.

SUMMARY OF THE INVENTION

In a pre-chamber spark plug according to the invention, the electrode arms are embedded in the center electrode and exit laterally from the center electrode. It is surprising that this allows achieving an improvement of the service life of the spark plug, as compared with the usual welding-on of the ignition electrode on the center electrode. This is attributed to the fact that, by embedding the electrode arms in the center electrode according to the invention, the contact surface created between the ignition electrode and the center electrode is enlarged. This allows an improved heat transfer from the ignition electrode to the center electrode. In addition, the mechanical connection between the ignition electrode and the center electrode can be considerably improved by the material of the center electrode enclosing an embedded section of the ignition electrode and generating a form closure between ignition electrode and center electrode in this manner.

In a pre-chamber spark plug according to the invention, a section of the electrode arms that is embedded in the center electrode can be completely covered by material of the center electrode. However, this is not imperative to utilize the described advantages of the invention. For example, the electrode arms can be made of round wire, with a small strip-shaped region of the round wire remaining uncovered. If the width of the uncovered strip is smaller than the wire diameter, it is, nevertheless, possible to attain form-locking embedding because the material of the center electrode engages around the widest point of the embedded round wire. A punching tool can be used to press in the ignition electrode. While the latter is pressed in, the punching tool touches the electrode arms in a strip-shaped region. This strip-shaped region of contact of the electrode arms with the punching tool can remain uncovered by the center electrode.

Preferably, the ignition electrode is pressed in to such a depth that a bottom side of the electrode arms, said bottom side facing the rear end of the center electrode, is distanced from the forward end of the center electrode by more than half the thickness of the electrode arms at the point where the electrode arms project from the lateral surface of the center electrode. Therein, the thickness of the electrode arms is to be measured in the longitudinal direction of the center electrode. With particular preference, the bottom side of the electrode arms is spaced apart from the forward end of the center electrode by more than two thirds of the thickness, more preferably by more than three quarters of the thickness, most preferably by more than four fifths of the thickness of the electrode arms, at the point where the electrode arms project from the lateral surface of the center electrode.

Furthermore, the invention relates to a method for mounting an ignition electrode to a center electrode of a pre-chamber spark plug having the features presented in claim 10. In this method, a front surface of the center electrode is heated up to a temperature which is sufficient for melting the material of the center electrode but is below the melting temperature of the material of the ignition electrode. The ignition electrode is then pressed into the molten material of the center electrode until the electrode arms are enclosed by material of the center electrode over the major part of their circumference and project from a lateral surface of the center electrode.

Preferably, the ignition electrode is pressed into the molten material of the center electrode until the embedded sections of the electrode arms are covered by material of the center electrode. To achieve this, it is not required to press the electrode arms into the electrode by a distance corresponding to their thickness after they have been fitted onto the center electrode. That is to say that, during pressing in, molten-on material of the center electrode is displaced that can cover the electrode arms.

By working with a temperature that is below the melting temperature of the ignition electrode, the connection that is established between the ignition electrode and the center electrode is not achieved by welding where the materials of the connected workpieces intermix with each other. Instead, a boundary surface is preserved between the ignition electrode and the surrounding material of the center electrode. The metallurgical phases, i.e., the materials, on the two sides of the boundary surface differ from each other. In its properties, this boundary surface is similar to the boundary surfaces of soldered connections where, likewise, only one of two materials involved, i.e., the solder material, was molten.

Preferably, iridium or an iridium-based alloy is used for the ignition electrode. Iridium has an advantageously high melting point. Due to its high melting temperature, an ignition electrode made of iridium or an iridium-based alloy can withstand arc discharges for a long time. Preferably, the ignition electrode of a pre-chamber spark plug according to the invention consists of iridium for at least 50 percent by weight, preferably for at least 70 percent by weight, more preferably for at least 90 percent by weight, most preferably for at least 95 percent by weight.

Preferably, the material of the center electrode, in which the electrode arms are embedded, is nickel or a nickel-based alloy. Preferably, the material of the center electrode, which surrounds the electrode arms, consists of nickel for at least 50 percent by weight, preferably for at least 60 percent by weight, more preferably for at least 70 percent by weight, most preferably by at least 80 percent by weight.

Preferably, the center electrode contains a copper core. In this manner, heat can be dissipated from the ignition electrode very well. To be mounted to the center electrode, the ignition electrode can be pressed into said center electrode to such a depth that the ignition electrode touches the copper core. It is, however, also possible that a layer of the material used for the external and front surfaces of the center electrode remains between the ignition electrode and the copper core. By pressing the ignition electrode into the center electrode the distance between the copper core and the ignition electrode is advantageously reduced.

Preferably, the ignition electrode is made of wire, most preferably round wire. It is, however, also possible to use flat wire or to make the ignition electrode as a punched-and-bent part of sheet metal. Preferably, the ignition electrode has four or six electrode arms which start in a common center and are, for example, arranged in a crosswise manner.

Preferably, the embedded section of the electrode arms, essentially, extends in parallel to the front surface of the center electrode. In this manner, it is easier to handle the ignition electrode while it is being pressed in and the risk of damage is reduced. It is particularly advantageous if the embedded section of the electrode arms encloses an angle with the longitudinal direction of the center electrode which deviates from a right angle by no more than 10°, most preferably by no more than 5°. It is, however, also possible to make use of an ignition electrode in which the rear, embedded section of the electrode arms is oriented in an inclined forward direction and encloses an angle with the longitudinal direction of the center electrode which deviates from a right angle by, for example, 20° or more.

BRIEF DESCRIPTION OF THE DRAWINGS

Further details and advantages of the invention will be illustrated by means of an exemplary embodiment with reference being made to the accompanying drawings. In the drawings.

DETAILED DESCRIPTION

Figure 1:
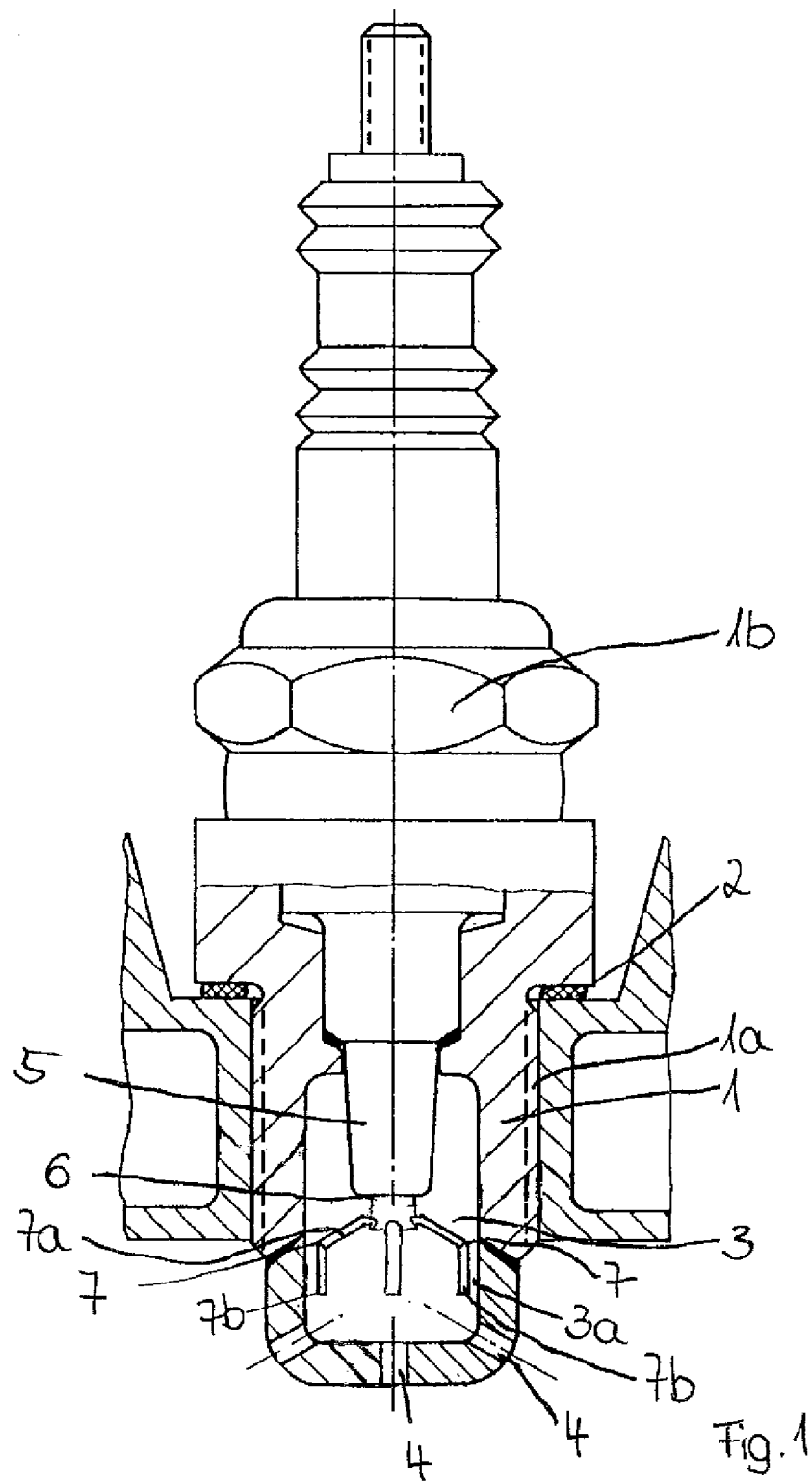
FIG. 1 shows an exemplary embodiment of a pre-chamber spark plug according to the invention.

FIG. 1 shows an exemplary embodiment of a pre-chamber spark plug, screwed into the cylinder head of an engine. The pre-chamber spark plug has a housing 1 with a screw-in thread 1a and a hexagonal section 1b. A washer 2 is pressed as a seal between the housing 1 and the cylinder head.

At its forward end, the housing 1 comprises a pre-chamber 3 with a plurality of openings 4. An insulator 5, for example, made of aluminum oxide or another ceramic material, is arranged in the housing 1, said insulator 5 surrounding a center electrode 6. The center electrode 6 supports an ignition electrode which is arranged in the pre-chamber 3 and comprises a plurality of electrode arms 7. The electrode arms 7 each have a rear section 7a which extends from the center electrode 6 in a radially outward direction and a forward section 7b which extends along a lateral pre-chamber wall 3a, is directed to the front and forms a spark gap between itself and the pre-chamber wall 3a.

In the exemplary embodiment shown, the ignition electrode has four electrode arms 7 that are arranged in a crosswise manner. The ignition electrode can be made of wire. Round wire but also flat wire are suitable. To produce the ignition electrode, it is, for example, possible to place two wire sections on each other in a crosswise manner and weld them to each other at the point where they touch each other. Subsequently, the ends of the wire sections are erected by being bent. The erected ends, then, form the forward sections 7b of the electrode arms 7. It is also possible to produce the ignition electrode as a punched-and-bent part of sheet metal.

Figure 2:
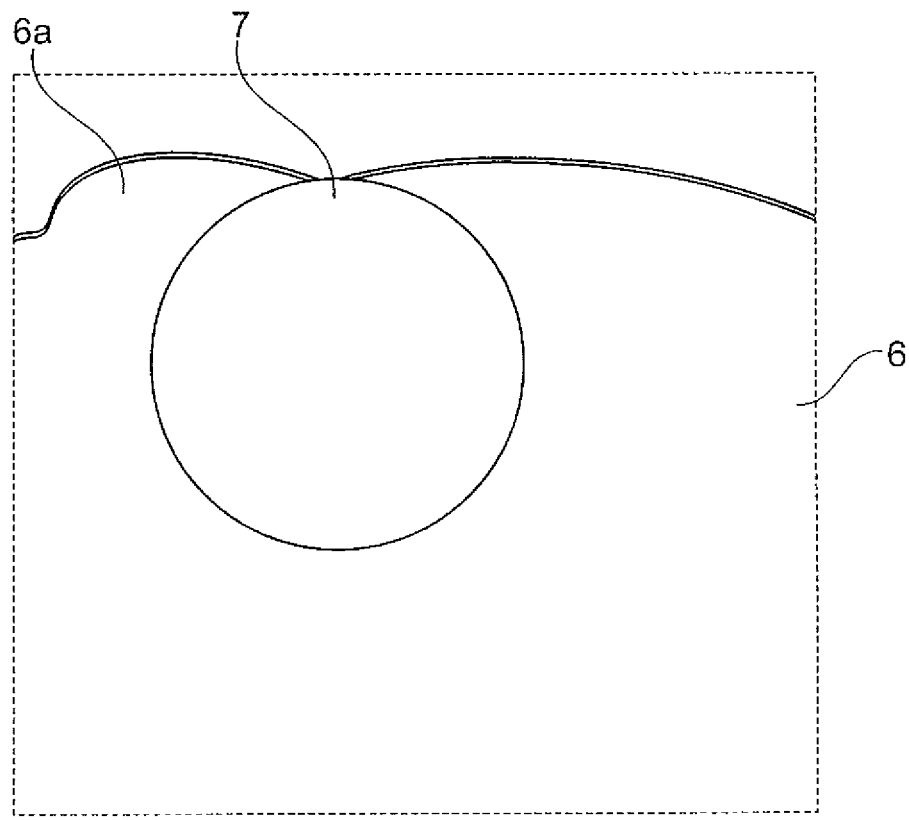
FIG. 2 shows a micrograph of an arm of the ignition electrode that is embedded in the center electrode.

The electrode arms 7 are embedded in the center electrode 6 so that they exit from a lateral surface of the center electrode 6. FIG. 2 shows a micrograph of an electrode arm 7 of the ignition electrode, said electrode arm 7 being embedded in the center electrode 6. In the exemplary embodiment shown, the electrode arm 7 is made of round wire.

To be mounted to the center electrode 6, the ignition electrode was fitted onto the center electrode 6 and, subsequently, the center electrode 6 was heated up to a temperature which is sufficient for melting softening or even the material of the center electrode 6 but is below the melting temperature of the material of the ignition electrode. Then, the ignition electrode was pressed into the molten-on material of the center electrode 6 and such that the electrode arms 7 are embedded in the center electrode 6. Therein, molten center electrode material 6a which, at least in part, covers the upper side of the pressed-in electrode arms 7 is displaced.

In the exemplary embodiment shown in FIG. 2, the electrode arms 7 of the ignition electrode were pressed into the center electrode 6 over a distance that is greater than half the thickness of the embedded electrode arm 7. For this reason, material of the center electrode 6 surrounds the electrode arm 7 over the major part of its circumference. In the exemplary embodiment shown, the electrode arm 7 is, in essence, completely enclosed, with the displaced molten mass 6a being taken into account, and covered by material of the center electrode 6. After the center electrode 6 has cooled down, the electrode arm 7 is connected to the center electrode 6 in a form-locking manner because the material of the center electrode 6 engages around the embedded electrode arm 7.

Figure 3:
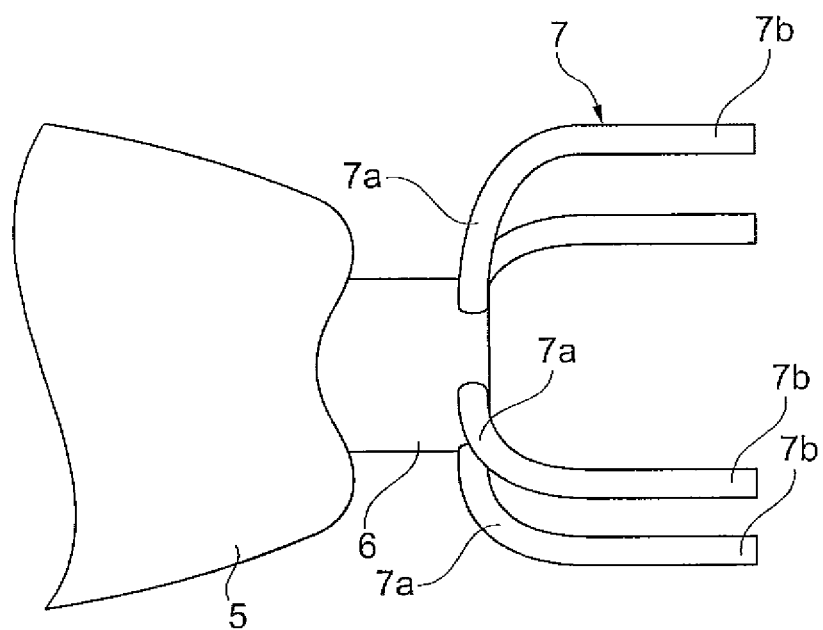
FIG. 3 is a schematic view of the center electrode with an ignition electrode mounted thereto.

FIG. 3 is a schematic view of the end of the center electrode 6, which projects from the insulator 6, along with the ignition electrode mounted thereto. As can be seen, the arms 7 of the ignition electrode exit laterally from the center electrode 6. Whereas the forward section 7b of the electrode arms 7 are oriented in the longitudinal direction of the center electrode 6 and, therefore, also in the longitudinal direction of the pre-chamber spark plug, the rear sections 7a and, in particular, the embedded sections of the electrode arms 7, extend in a transverse direction in relation thereto. In the exemplary embodiment shown, the embedded sections of the electrode arms 7, essentially, are oriented in parallel to the front surface of the center electrode 6.

Iridium-based alloys, for example, iridium-rhenium and/or iridium-molybdenum alloys, are, particularly, appropriate as material for the ignition electrode. Preferably, the ignition electrode consists of iridium for at least 95 percent by weight. Admixtures of up to 2 percent by weight of rhenium and up to 1 percent by weight of molybdenum are of particular advantage.

Nickel-based alloys are, particularly, suitable for the center electrode 6. Center electrodes 6 comprising a copper core facilitate particularly good heat dissipation. When the ignition electrode is embedded in such a center electrode 6, the ignition electrode can touch the copper core or be in contact only with the material of the center electrode 6 that surrounds the copper core, i.e., for example, a nickel-based alloy.

REFERENCE SYMBOLS

1 Housing
1a Screw-in thread

1b Hexagon bolt
2 Washer
3 Pre-chamber
3a Pre-chamber wall
4 Opening
5 Insulator
6 Center electrode
6a Displaced material of the center electrode
7 Electrode arms
7a Rear section
7b Forward section

What is claimed is:

1. A pre-chamber spark plug comprising:
    a housing having a forward end with a pre-chamber having a plurality of openings,
    an insulator disposed in the housing; and
    a center electrode surrounded by the insulator and supporting an ignition electrode disposed in the pre-chamber, the ignition electrode comprising a plurality of electrode arms, the electrode arms being held in the center electrode in a form locking manner and covered with center electrode material;
    each electrode arm comprising a rear section extending in a transverse direction in relation to a longitudinal direction of the center electrode and a forward section extending along a pre-chamber wall to form a spark gap between therebetween,
    the electrode arms being embedded in the center electrode and project from a lateral surface of the center electrode.

2. The pre-chamber spark plug according to claim 1, wherein the ignition electrode is formed from a material having a higher melting point than a material of the center electrode embedding the electrode arms.

3. The pre-chamber spark plug according to claim 1, wherein the ignition electrode has an iridium content of at least 50 percent by weight.

4. The pre-chamber spark plug according to claim 1, wherein the ignition electrode has an iridium content of at least 70 percent by weight.

5. The pre-chamber spark plug according to claim 1, wherein the ignition electrode has an iridium content of at least 90 percent by weight.

6. The pre-chamber spark plug according to claim 1, wherein the ignition electrode has an iridium content of at least 95 percent by weight.

7. The pre-chamber spark plug according to claim 1, wherein a bottom side of each electrode arm, facing a rear end of the center electrode, is distanced from a forward end of the center electrode by more than half a thickness of the electrode arms.

8. The pre-chamber spark plug according to claim 1, wherein a bottom side of each electrode arm, facing a rear end of the center electrode, is distanced from a forward end of the center electrode by more than two thirds of the electrode thickness.

9. The pre-chamber spark plug according to claim 1, wherein a bottom side of each electrode arm, facing a rear end of the center electrode, is distanced from a forward end of the center electrode by more than three quarters of the electrode thickness, at the point where the electrode arms project from the lateral surface of the center electrode.

10. The pre-chamber spark plug according to claim 1, wherein a section of the electrode arms embedded in the center electrode is, at least in part, covered by material of the center electrode.

11. The pre-chamber spark plug according to claim 1, wherein the center electrode contains a copper core.

12. The pre-chamber spark plug according to claim 1, wherein the electrode arms are made of wire.

13. The pre-chamber spark plug according to claim 1, wherein the embedded section of the electrode arms extends substantially in parallel to a front surface of the center electrode.

14. The pre-chamber spark plug according to claim 1, wherein the center electrode encloses the electrode arms over most of their circumference.

15. A pre-chamber spark plug comprising:
    a housing having a forward end with a pre-chamber having a plurality of openings,
    an insulator disposed in the housing, and
    a center electrode surrounded by the insulator and supporting an ignition electrode disposed in the pre-chamber, the ignition electrode comprising a plurality of electrode arms,
    each electrode arms comprising a rear section extending in a transverse direction in relation to a longitudinal direction of the center electrode and a forward section extending along a pre-chamber wall to form a spark gap therebetween,
    the electrode arms being embedded in the center electrode and project from a lateral surface of the center electrode, and
    a section of the embedded electrode arms is covered by material of the center electrode.

16. A method for mounting an ignition electrode, having a plurality of electrode arms, to a center electrode of a pre-chamber spark plug, the method comprising:
    fitting the ignition electrode onto a front surface of the center electrode,
    heating the front surface of the center electrode to a temperature sufficient for softening the material of the center electrode but below a melting temperature of the material of the ignition electrode, and
    pressing the ignition electrode into the softened material of the center electrode until the electrode arms are enclosed by material of the center electrode over the major part of their circumference, so that the center electrode material covers at least, in part, an upperside of the pressed in electrode arms and project from a lateral surface of the center electrode, wherein the lateral surface is opposite side faces in a direction opposite to a direction in which the ignition electrode is moved by pressing into the softened material of the center electrode.

* * * * *